D. NETTENSTROM.
HYDRAULIC TRANSMISSION.
APPLICATION FILED APR. 25, 1917.
1,289,520.
Patented Dec. 31, 1918.
2 SHEETS—SHEET 1.
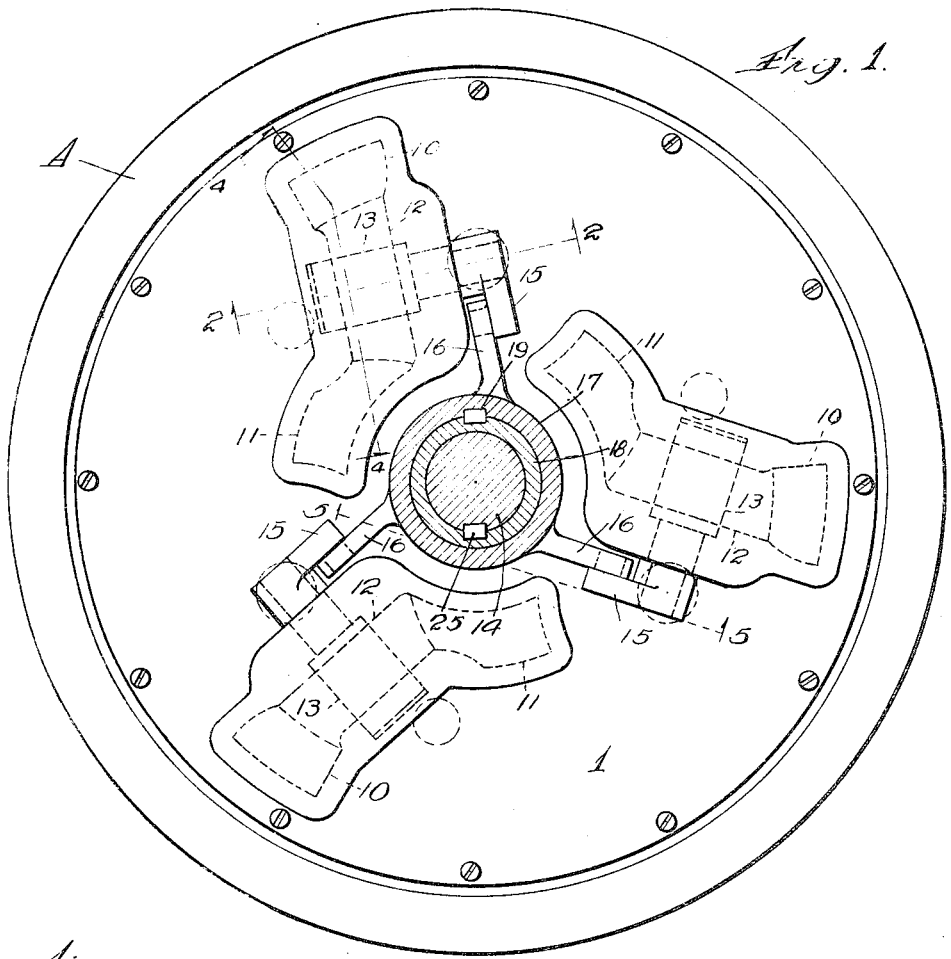
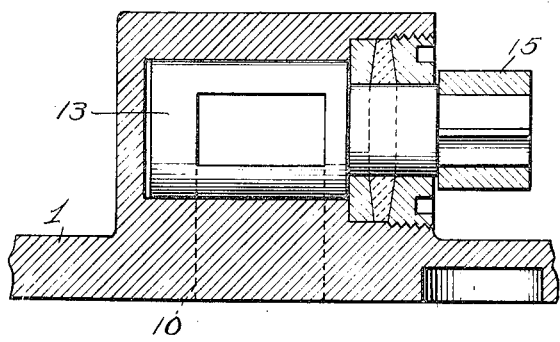

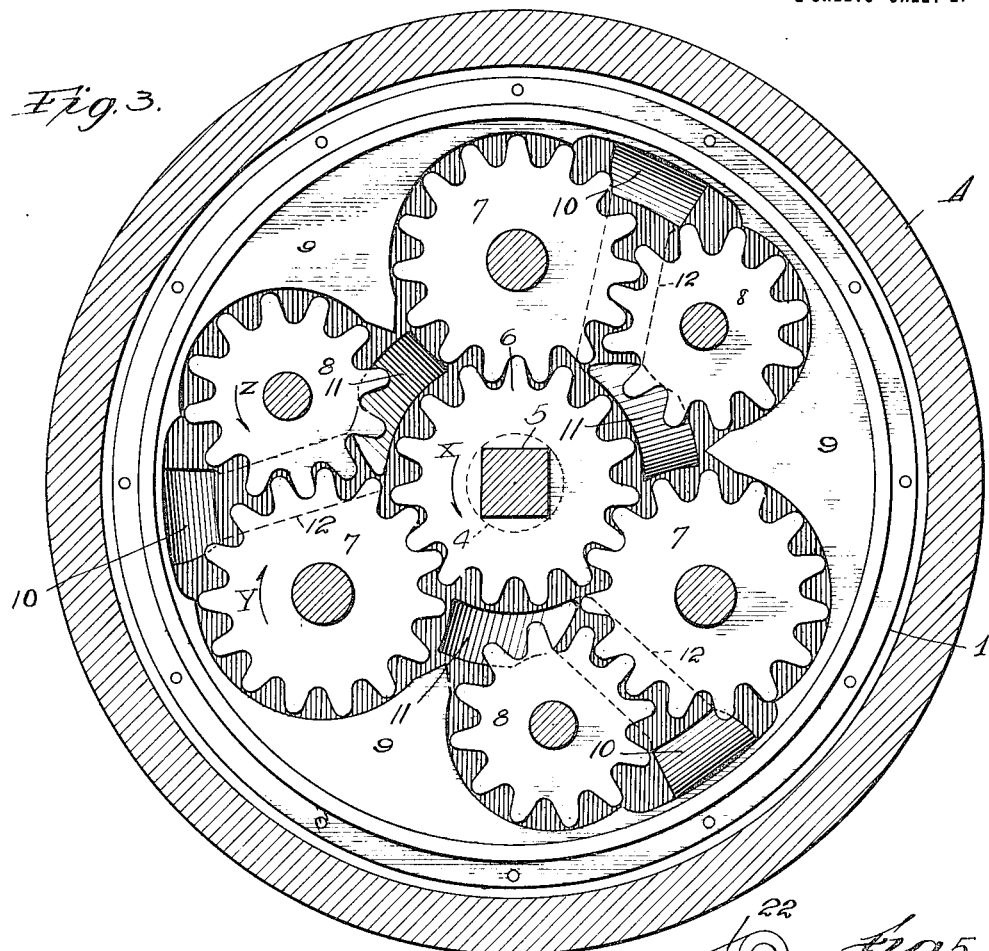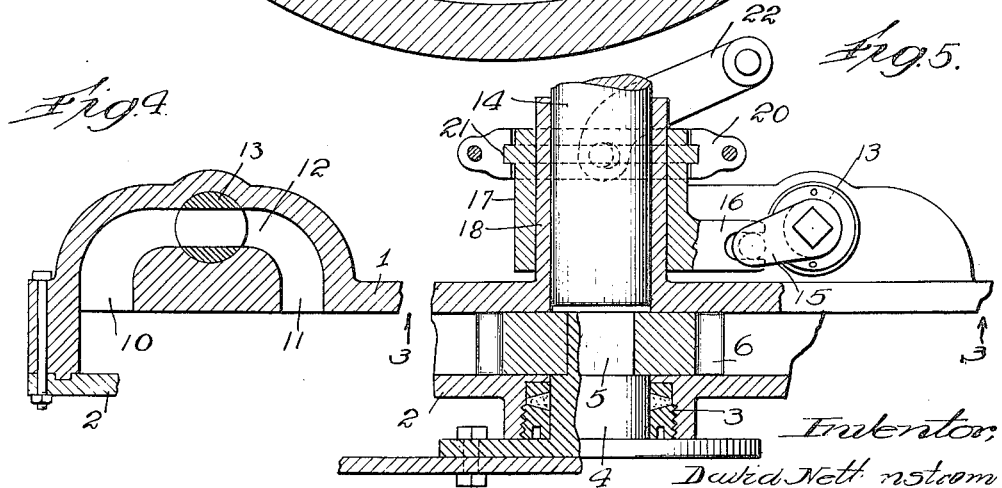

UNITED STATES PATENT OFFICE.

DAVID NETTENSTROM, OF CHICAGO, ILLINOIS.

HYDRAULIC TRANSMISSION.

1,289,520.　　　　　Specification of Letters Patent.　　Patented Dec. 31, 1918.

Application filed April 25, 1917. Serial No. 164,342.

*To all whom it may concern:*

Be it known that I, DAVID NETTENSTROM, a citizen of the United States, residing at Chicago, in the county of Cook and the State of Illinois, have invented certain new and useful Improvements in Hydraulic Transmission, of which the following is a specification, reference being had to the accompanying drawings, forming a part thereof.

The object of this invention is to provide a simple and inexpensive device, embodying the principle of a gear rotary pump as applied to the transmission of power through a fluid medium. It consists of the features and elements of construction and their combination hereinafter described and shown in the drawings as indicated by the claims.

In the drawings:—

Figure 1 is an elevation partly in section showing a transmission device embodying this invention, and particularly illustrating the arrangement of the controlling valves and actuating mechanism.

Fig. 2 is a detail section taken as indicated at line 2—2 on Fig. 1.

Fig. 3 is a trans-axial sectional view taken as indicated at line 3—3 on Fig. 5, and showing all the gears of the device as mounted within the casing.

Fig. 4 is a detail section taken as indicated at line 4—4 on Fig. 1.

Fig. 5 is a detail section taken as indicated at line 5—5 on Fig. 1.

The transmission device shown in the drawings for illustrating this invention is especially designed for use in a motor vehicle, being arranged for compact installation within the flanged rim, A, of the fly wheel of an internal combustion motor, such as is commonly found in automobiles, motor trucks, power boats and the like. Fig. 1 may be also understood as a view looking toward the engine from the rear, while Fig. 3 is a sectional view of the transmission looking in the opposite direction, and therefore showing the rim, A, of the engine flywheel in section.

The transmission itself is contained within a two-part casing, whose sections, 1 and 2, may be referred to respectively as the rear and forward sections of the casing. The rear section, 1, contains practically the entire mechanism of the transmission, while the forward section, 2, is essentially a cover plate, fitted at the center with a gland, 3, to prevent the escape of oil around the terminal portion, 4, of the engine shaft, through which power is transmitted to the device. Within the transmission casing, the end of the shaft, 4, is squared at 5, for driving engagement with a central gear, 6, which as viewed in Fig. 3 appears as the sun gear of a planetary system, while the remaining gears of the system constitute elements of a gear pump. As shown, there are three of these pumps, each comprising two gears; namely, an idler gear, 7, and a planet gear, 8, the latter being connected with the sun gear, 6, by means of the idler gear, 7.

The rear section, 1, of the casing is provided with partitions, 9, each having circularly curved portions, which fit closely around parts of the gears, 7 and 8, barely avoiding actual contact with the ends of the teeth of these gears in that portion of their travel in which they are remote from the point of intermeshing with each other. Adjacent the intermeshed teeth of the gears, 7 and 8, the casing section, 1, is formed with ports, 10 and 11, the former opening into a little chamber at the side of approach of the teeth to the point of intermeshing, and the latter opening from a corresponding chamber at the other side of said intermeshed teeth. In the back wall of the casing section, 1, there is formed a passage, 12, connecting the ports, 10 and 11, and fitted with a control valve, 13, there being three such passages, 12, with their associated valves, 13, arranged as shown in Fig. 1, and each pertaining to one of the pairs of gears, 7 and 8, shown in Fig. 3.

With the central driver gear, 6, revolving in the direction indicated by the arrow, X, resulting in a direction of rotation of the gear, 7, indicated by the arrow, Y, thereon, and a final direction of the gear, 8, as indicated by the arrow, Z, it will be seen that, if the passages, 12, and other spaces in the casing are filled with oil, or other suitable fluid, the oil which is pocketed in the interstices of the teeth of gears, 7 and 8, adjacent the partition, 9 will be delivered by the rotation of said gears to the chamber adjoining the ports, 10, and since it cannot be passed between the gears, 7 and 8, on account of the interlocking of their intermeshing teeth, this oil will tend to be pumped through the passage, 12, emerging at the port, 11. The oil thus delivered at the port, 11, will be divided, part of it being picked up by the gear, 8, and again passed around along the partition, 9, to the same port, 10, through which it was previously passed, and the other portion being picked up by the gear, 7, adjacent the port, 11, and belonging to the next adjacent pair of pump gears, 7 and 8. In this way there is constant intercommunication between the three sets of pump gears shown in Fig. 3; but, so long as the valves, 13, are open, the oil in the casing can only be pumped around and around the passages, 12, by the simultaneous action of the three sets of pump gears.

Since the gears, 7 and 8, are all journaled in the casing, composed of sections, 1 and 2, and, since the casing is rotatably mounted with respect to the driving shaft, 4, it will be evident that sufficient resistance to rotation of the individual gears, 7 and 8, about their own axes, would tend to result in bodily rotation of the casing about the axis of the driver gear, 6. Thus, if the valves, 13, be closed, so as to practically prevent the flow of oil around its circuit through the passages, 12, the pumping gears, 7 and 8, will be practically locked against rotation, and continued rotation of the driver gear, 6, will simply carry them bodily about the axis of said gear, 6, thus rotating the entire casing about said axis. The rear section, 1, of the transmission casing is keyed to a shaft, 14, which is to be driven by the power applied to the shaft, 4.

For operating the valves, 13, which are shown as simple turncocks, each of said valves is provided with a short crank arm, 15, as seen in Fig. 1, and such crank arms are all engaged by projections, 16, of a slidable collar, 17, loosely mounted on the hub portion, 18, of the casing member, 1. A key, or feather, 19, insures rotation of the sleeve, 17, with the casing member, 1; but a shifter collar, 20, suitably engaging a flange, 21, on the collar, 17, and connected with an operating lever, 22, serves to move the collar, 17, longitudinally on the hub, 18, for rocking the crank arms, 15, and thus varying the adjustment of the valves, 13, all together. Since partial closure of said valves, 13, by restricting the passages, 12, will result in some back pressure against the pumping gears, 7 and 8, such adjustment of the valves, 13, will cause rotation of the casing at a speed less than the speed of rotation of the driver gear, 6, and, as the passages, 12, are further restricted by more nearly complete closure of the valves, 13, the speed of the casing will be increased until, upon such complete closure of said valves, 13, the speed of the casing will very nearly approach that of the gear, 6, differing only by reason of any slight leakage which may occur around the pumping gears, 7 and 8, within the casing.

I claim:

1. In a power transmission device, a driving member comprising a sun gear and a driven member comprising a casing mounted for independent rotation about the axis thereof, together with a planet gear journaled in said casing and an idler gear connecting the sun and planet gears, whereby said casing is partitioned into two chambers at respectively opposite sides of such gear train, a by-pass connecting said chambers, a quantity of fluid in said chambers and by-pass, and a valve controlling said by-pass, adapted for adjustment when the casing is rotating.

2. In a power transmission device, a driving member and a driven member including a gear pump mounted for bodily rotation about said driving member, but connected for actuation thereby, said pump having an inlet near the axis of its bodily rotation, and an outlet radially remote from said axis, a valved passage connecting said outlet and inlet, and means for adjusting the valve thereof, during rotation of the driven member.

3. In a power transmission device, a driving member and a driven member including a plurality of gear pumps, symmetrically disposed for bodily rotation about said driving member, and all connected for actuation thereby, each pump having an inlet near the axis of its bodily rotation and an outlet radially remote from said axis, and a valved passage connecting said outlet and inlet, together with means for simultaneously adjusting the valves of said pumps during rotation of the driven member.

4. In a power transmission device, a driving gear, a casing inclosing said gear and mounted for independent rotation about the axis thereof, a gear pump comprising a pair of intermeshed gears journaled in said casing and thereby mounted for bodily rotation about the driving gear, and connected for actuation thereby through the intermeshing of one of said gears with the driver, said pump being provided with an inlet in the casing adjacent the driver gear, and an outlet in said casing radially remote from said driver, a valved by-pass connecting said outlet and inlet, and means for adjusting the valve thereof during rotation of the casing.

5. A power transmission device, comprising a driver gear, a casing mounted for independent rotation about the axis of said gear, a pair of intermeshed gears constituting a partition in said casing to form therein a chamber adjacent said driver, and a second chamber radially remote therefrom, a valved by-pass connecting said chambers, one of said pair of gears meshing with said driver, and a quantity of fluid in the circuit comprising said chambers and by-pass, adapted to be pumped around said circuit by rotation of said pair of gears, and means for adjusting the valves of the by-pass for restricting the flow of fluid in said circuit.

6. A power transmission device comprising a casing, a plurality of pairs of intermeshed gears therein, forming partitions thereof, which divide said casing into a central chamber, and a series of radially remote chambers, a driver gear in said central chamber meshing with one gear of each pair, and thus subdividing the central chamber into a series of chambers adjacent said central gear, a valved by-pass connecting each of said adjacent chambers with one of the remote chambers, the casing being mounted for rotation about the axis of the central gear and independently thereof, a quantity of fluid in said chambers and by-passes and means for adjusting the valves, when the casing is rotating.

7. A power transmission device comprising a driver gear, a casing mounted for independent rotation about the axis of said gear, a pair of intermeshed gears, constituting a partition in said casing to form therein a chamber adjacent said driver, and a second chamber radially remote therefrom, a valved by-pass connecting said chambers, a quantity of fluid in the circuit comprising said chambers and said by-pass, one of a pair of gears being operatively connected with the driver and arranged to rotate in a direction for pumping the fluid through said by-pass from the remote chamber to the chamber adjacent said driver, and means for adjusting the valves in said by-pass during rotation of the casing.

In testimony whereof, I have hereunto set my hand this 21st day of April, 1917.

DAVID NETTENSTROM.